(12) United States Patent (10) Patent No.: US 12,576,966 B1
Ogg (45) Date of Patent: Mar. 17, 2026

(54) SUPERSONIC AIRCRAFT

(71) Applicant: Pivotal Supersonic Inc., Tensleep, WY (US)

(72) Inventor: Steven S. Ogg, Carlsbad, CA (US)

(73) Assignee: Pivotal Supersonic Inc., Tensleep, WY (US)

( * ) Notice: Subject to any disclaimer, the term of this patent is extended or adjusted under 35 U.S.C. 154(b) by 0 days.

(21) Appl. No.: 18/892,368

(22) Filed: Sep. 21, 2024

Related U.S. Application Data

(63) Continuation-in-part of application No. 17/461,976, filed on Aug. 30, 2021, now Pat. No. 12,129,025.

(60) Provisional application No. 63/073,798, filed on Sep. 2, 2020.

(51) Int. Cl.
| | |
|---|---|
| B64C 30/00 | (2006.01) |
| B64C 3/40 | (2006.01) |
| B64D 27/12 | (2006.01) |
| B64D 29/02 | (2006.01) |
| B64D 33/02 | (2006.01) |

(52) U.S. Cl.
CPC ................ B64C 30/00 (2013.01); B64C 3/40 (2013.01); B64D 27/12 (2013.01); B64D 29/02 (2013.01); B64D 33/02 (2013.01)

(58) Field of Classification Search
CPC .. B64C 30/00; B64C 3/32; B64C 3/40; B64C 21/00; B64C 39/10; B64C 21/01; B64D 27/18
See application file for complete search history.

(56) References Cited

U.S. PATENT DOCUMENTS

| | | | | | |
|---|---|---|---|---|---|
| 3,792,584 | A | * | 2/1974 | Klees ...................... | F02K 3/077 |
| | | | | | 60/226.3 |
| 2004/0251378 | A1 | * | 12/2004 | Bagnall .................. | B64D 33/02 |
| | | | | | 244/53 B |
| 2005/0230531 | A1 | * | 10/2005 | Horinouchi .............. | B64C 3/10 |
| | | | | | 244/47 |
| 2015/0284104 | A1 | * | 10/2015 | Zhao ...................... | F02C 7/055 |
| | | | | | 60/39.092 |

* cited by examiner

*Primary Examiner* — Kimberly S Berona
*Assistant Examiner* — Steven J Shur
(74) *Attorney, Agent, or Firm* — Clause Eight; Michael Catania

(57) ABSTRACT

A supersonic aircraft is disclosed herein. The supersonic aircraft comprises one or more fuselages, one or more wings, at least one wing-mounted engine, at least one inlet mounted on the upper surface of or above the wing, an upper wing surface propulsion system fairing, and a lower wing surface propulsion system fairing or lower wing surface modification to account for the presence of the engine.

15 Claims, 25 Drawing Sheets

Area of fan, Afan = pi * radius^2.
Afan = pi*(44.0/2.)^2.
Afan = 1520.53 square inches COS(α) = 12.34/22.0
α = ACOS(12.34/22.0)
α = .9751 radians
α = 55.87 deg.

Sector of circle area, Asect = Afan*(α/360)
Asect = 1520.53*(55.87/360)
Asect = 235.97 sq. in.

Right triangle area, Atri = 0.5*height*base
height  = 12.34 in.
Base = sqrt(22.0^2.-12.34^2.)
Base = 18.21 in.
Atri = 0.5*12.34*18.21
Atri = 112.40 sq. in.

Embedded area, Aemb37 = 2*(Asect-Atri)
Aemb37 = 2*(235.97-112.40)
Aemb37 = 247.15 sq. in.

Area of fan, Afan = pi * radius^2.
Afan = pi*(44.0/2.)^2.
Afan = 1520.53 square inches COS(α) = 19.92/22.0
α = ACOS(19.92/22.0)
α = .4389 radians
α = 25.14 deg.

Sector of circle area, Asect = Afan*(α/360)
Asect = 1520.53*(25.14/360)
Asect = 106.20 sq. in.

Right triangle area, Atri = 0.5*height*base
height = 19.92 in.
base = sqrt(22.0^2.-19.92^2.)
base = 9.35 in.
Atri = 0.5*19.92*9.35
Atri = 93.08 sq. in.

Embedded area, Aemb38 = 2*(Asect-Atri)
Aemb38 = 2*(106.20-93.08)
Aemb38 = 26.24 sq. in.

Aemb36 = Aemb37 − Aemb38
Aemb36 = 247.15 − 26.24
Aemb36 = 220.91 sq. in.
Embedded area ratio, Aratio36 = Aemb36/Afan
Aratio36 = 220.91/1520.53
Aratio36 = 0.1543 = 15.4%

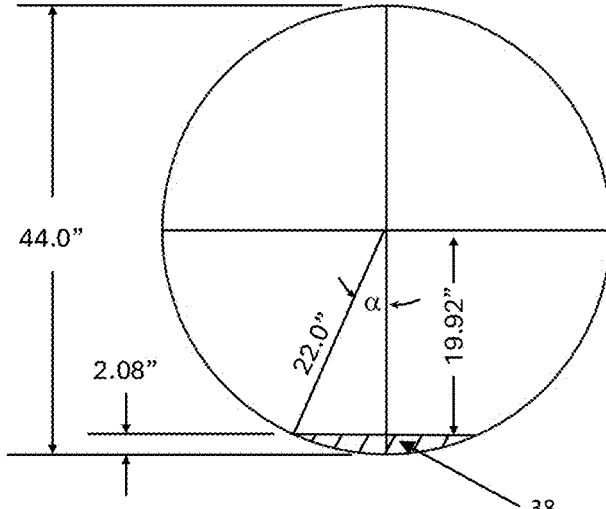

Figure 19

Area of fan, Afan = pi * radius^2.
Afan = pi*(44.0/2.)^2.
Afan = 1520.53 square inches COS(α) = 15.75/22.0
α = ACOS(15.75/22.0)
α = .7732 radians
α = 44.30 deg.

Sector of circle area, Asect = Afan*(α/360)
Asect = 1520.53*(44.30/360)
Asect = 187.10 sq. in.

Right triangle area, Atri = 0.5*height*base
height = 15.75 in.
base = sqrt(22.0^2.-15.75^2.)
base = 15.36 in.
Atri = 0.5*15.75*15.36
Atri = 120.96 sq. in.

Embedded area, Aemb = 2*(Asect-Atri)
Aemb = 2*(187.10-120.96)
Aemb = 132.28 sq. in.

Aratio = Aemb/Afan
Aratio = 132.28/1520.53
Aratio = .0870 = 8.7%

Area of fan, Afan = pi * radius^2.
Afan = pi*(75.0/2.)^2.
Afan = 4417.86 square inches COS($\alpha$) = 28.42/37.50
$\alpha$ = ACOS(28.42/37.50)
$\alpha$ = .71076 radians
$\alpha$ = 40.72 deg.

Sector of circle area, Asect = Afan*($\alpha$/360)
Asect = 4417.9*(40.72/360)
Asect = 499.71 sq. in.

Right triangle area, Atri = 0.5*height*base
height = 28.42 in.
base = sqrt(37.50^2.-28.42^2.)
base = 24.465 in.
Atri = 0.5*29.36*24.465
Atri = 359.15 sq. in.

Embedded area, Aemb = 2*(Asect-Atri)
Aemb = 2*(499.71-359.15)
Aemb = 281.13 sq. in.

Aratio = Aemb/Afan = 281.13/4417.86
Aratio = 0.0636 = 6.36%

SUPERSONIC AIRCRAFT

CROSS REFERENCES TO RELATED APPLICATIONS

The Present Application is a continuation-in-part application of U.S. patent application Ser. No. 17/461,976, filed on Aug. 30, 2021, which claims priority to U.S. Provisional Patent Application No. 63/073,798 filed on Sep. 2, 2020, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to supersonic aircraft.

Description of the Related Art

There are and have been a number of solutions proposed for a supersonic aircraft. Some of these solutions assume that community noise certification rules less stringent than those imposed upon subsonic aircraft will be allowed for supersonic aircraft. This is a shortsighted approach that imposes a great deal of risk to the commercial viability of the aircraft program. Other solutions attempt to reduce community noise by increasing engine bypass ratio to reduce jet velocity, but these solutions are similarly unable to meet the needs of the industry because they result in excessively heavy propulsion systems with poor aerodynamic efficiency. Still, other solutions seek to reduce community noise by placing engines above the wing, but these solutions also fail to meet industry needs because they create excessive aerodynamics drag and have poor accessibility for maintenance purposes.

BRIEF SUMMARY OF THE INVENTION

It would be desirable to have an aircraft that could meet stringent community noise requirements while minimizing the adverse impact to the maximum takeoff gross weight required to meet the intended mission requirements. Furthermore, it would be desirable to have a configuration that provided easy access for maintenance of the engines. Still, further, it would also be desirable to have a configuration that reduced the weight of the propulsion system to improve the overall performance of the aircraft. The disclosed device advantageously fills these needs and addresses the aforementioned deficiencies by providing a means of shielding the forward radiated fan noise while improving the cruise lift-to-drag ratio and engine maintenance access as compared to traditional propulsion system installations.

Disclosed is a supersonic aircraft, which is made up of the following components; one or more fuselages, one or more wings, at least one wing-mounted engine, at least one inlet mounted on the upper surface of or above the wing, an upper wing surface propulsion system fairing, and a lower wing surface propulsion system fairing or lower wing surface modification to account for the presence of the engine. These components are related as follows: The fuselage(s) carries a payload and/or fuel, the wing is attached to the fuselage and provides the necessary lifting force, the at least one engine is mounted on the wing such that some portion of the lower surface of the wing includes a fairing to aerodynamically cover at least a portion of the engine or the wing surface must be modified to cover the engine or its associated systems or structure. The at least one inlet is mounted such that the majority of air feeding the engine comes from above the wing.

The device may also have one or more of the following: one or more fixed wings, one or more variable-sweep wings, one or more blended wing bodies, one or more joined wings, one or more laminar flow wings, one or more hybrid laminar flow wings, one or more oblique wings, one or more horizontal tails, one or more canards with either a high, mid, or low vertical position on the body, one or more vee tails, two engines, three engines, four or more engines, one or more nozzles for one or more engines. The engine may be powered by any type of fuel suitable for aircraft flight such as Jet A aviation fuel, sustainable aviation fuels, hydrogen, etc. The one or more wing-mounted engines and associated structure may be embedded in the wing, located entirely below the wing or partially protruding below the surface of the wing. A distinct fairing may be used to cover the engine or portion of the engine below the wing. Alternatively, the wing lower surface may be designed to encompass or embed the engine within the wing structure provided that the lower surface of the wing is modified to create a positive lift interference. The above wing inlet may feed one or more engines. The inlet shape may be of any shape that provides the necessary compression of the flow for the engine. This shape may be circular, oval, elliptical, semi-elliptical, square, rectangular, rectangular with radiused corners, or any other shape deemed best. The inlet may have a surface flush with the wing upper surface or may be mounted about the upper surface of the wing to prevent ingestion of the wing boundary layer. The inlet may have a compression surface forward of the inlet face to efficiently decelerate the flow while maintaining high total pressure. This compression surface may be of any shape that is commensurate with the shape of the inlet cowling. One or more variable sweep wings may be utilized to improve the lift to drag ratio that allows for a deeper reduction in thrust during the climb-out phase of flight. For a given community noise certification or operational requirement this allows the engine to be designed to higher jet velocity and hence lower bypass ratio. This reduces the weight of the propulsion system and also reduces the installed drag of the engines.

The disclosed aircraft is unique when compared with other known aircraft and solutions because it provides: (1) an inlet for wing-mounted engines that is above the wing surface and hence provides dramatically reduced forward radiated fan noise, (2) an engine that is embedded within the wing thus reducing total frontal area and wetted (subject to aerodynamic shearing stresses or friction drag) area which results in improved cruise efficiency while providing ease of maintenance access from below the wing, (3) an upper surface inlet/engine fairing that provides favorable lift interference with the wing and body and hence reduces the drag of the airplane at constant lift, (4) an under wing fairing or surface modification that provides a pressure field that has beneficial lift and drag interference as compared to an upper wing surface mounted engine; and (5) a variable sweep wing that provides a significantly improved lift to drag ratio enabling a greater level of thrust reduction during climb-out therefore allowing for the use of a lower bypass ratio engine which has a reduced fan diameter that allow for a improved structural and aerodynamic installation with the wing.

The disclosed supersonic aircraft is unique in that it is structurally different from other known solutions. More specifically, the device is unique due to the presence of (1) an inlet face located on or above the upper surface of a wing, (2) a propulsion system having a portion extending below the lower surface of the wing, (3) a serpentine inlet duct that connects the inlet face and the aerodynamic interface plane of the engine, (4) an upper surface nacelle, that extends aft from the inlet face, (5) a lower surface fairing or surface modification that starts forward of the portion of the propulsion system extending below the lower surface of the wing, and (6) a variable-sweep wing.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 19 shows the geometry from the bottom right of FIG. 17 rotated so that the linear interpolation of the lower wing surface is horizontal and shows an example calculation of cross-hatched area along with the calculation of Aratio, the linear wing overlap area to total fan diameter area.

DETAILED DESCRIPTION OF THE INVENTION

Figure 1:
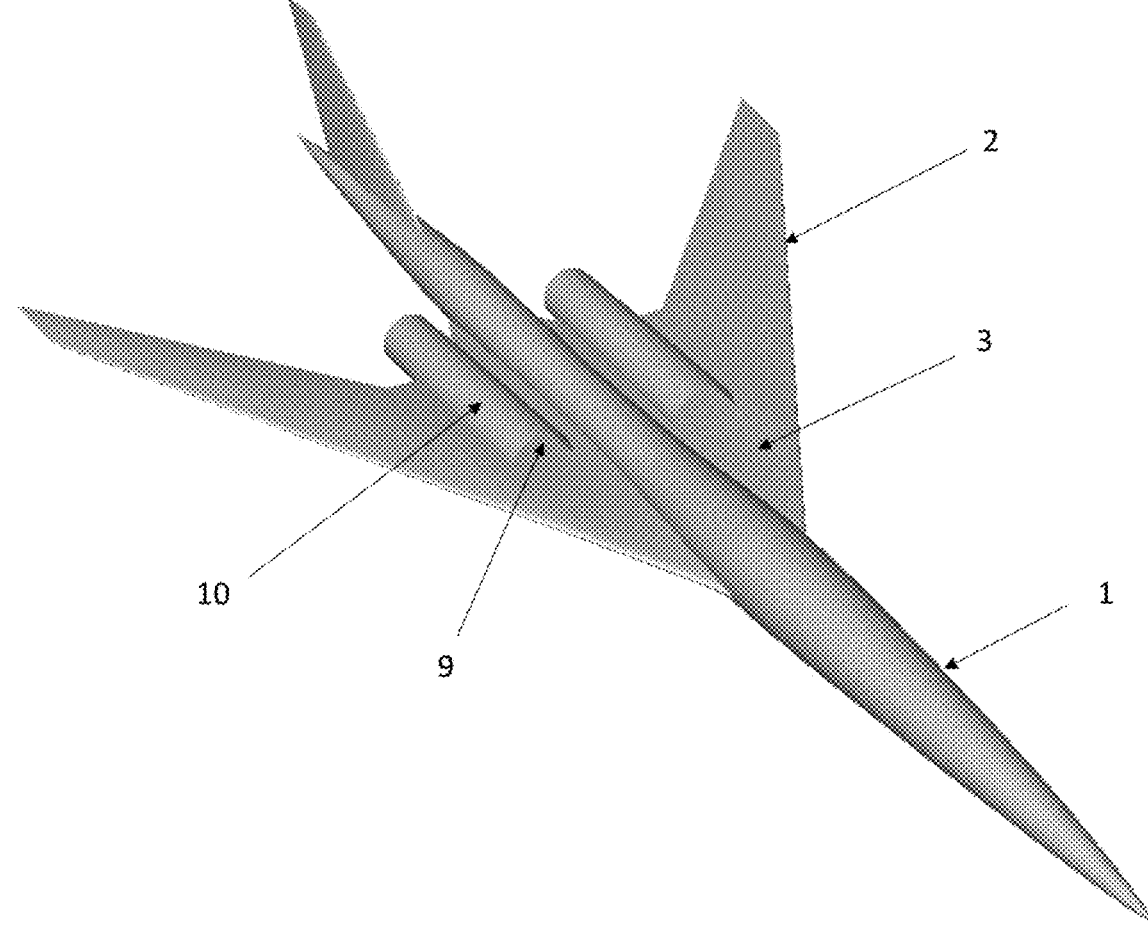
FIG. 1 shows an upper isometric view of supersonic aircraft with one embodiment of the invention.

The reference numbers for the figures are as follows:

1 is a fuselage or body.

2 is a wing.

3 is the upper surface of the wing.

4 is a curve, located in a plane at the mean X value of the aerodynamic interface plane, lying on the surface 3, inboard of the propulsion system.

5 is a curve, located in a plane at the mean X value of the aerodynamic interface plane, lying on the surface 3, outboard of the propulsion system.

6 is the lower surface of the wing.

7 is a curve, located in a plane at the mean X value of the aerodynamic interface plane, lying on the surface 6, inboard of the propulsion system.

8 is a curve, located in a plane at the mean X value of the aerodynamic interface plane, lying on the surface 6, outboard of the propulsion system.

9 is the entrance to the inlet of the propulsion system.

10 is the upper nacelle surface.

11 is a curve, located in a plane at the mean X value of the aerodynamic interface plane, lying on the surface 10.

12 is a curve, lying on the surface 10, that represents the outer nozzle exit, in the cruise configuration, which is above the trailing edge of the wing at the spanwise position of the nozzle.

13 is the lower nacelle surface.

14 is a curve, located in a plane at the mean X value of the aerodynamic interface plane, lying on the surface 13.

16 is a circle projected onto the aerodynamic interface plane whose diameter and position in the Y-Z plane represent the outer circumference of the maximum diameter turbomachinery component.

17 is a point located at the lowest extent of the maximum rotating turbomachinery component as projected normally onto the aerodynamic interface plane

18 is a line representing the linear interpolation of the upper surface of the wing from a point on the wing just inboard of the propulsion system to a point on the wing just outboard of the propulsion system. If the wing does not exist on either side of the propulsion system then the line should be considered to be at the same waterline (vertical location) as the existing point that is just inboard or just outboard of the propulsion system.

19 is a point on line 18 at the same spanwise position (Y value) as point 17.

20 is a point on the crown of circle 16 at the same spanwise position or Y value as point 17.

21 is a curve on an inboard upper wing surface propulsion system fillet fairing.

22 is a curve on an outboard upper wing surface propulsion system fillet fairing.

23 is the intersection of the inboard wing lower surface and the lower nacelle at the body station of the most forward maximum-diameter rotating turbomachinery component.

24 is the intersection of the inboard wing upper surface and the upper nacelle at the body station of the most forward maximum-diameter rotating turbomachinery component.

25 is the intersection of the outboard wing lower surface and the lower nacelle at the body station of the most forward maximum-diameter rotating turbomachinery component.

26 is the intersection of the inboard wing upper surface and the upper nacelle at the body station of the most forward maximum-diameter rotating turbomachinery component.

27 is a line connecting the intersection points 23 and 25.

28 is the cross-hatched area bounded by lines 18 and 27 and the circle 16.

29 is a curve lying on an inboard lower wing surface propulsion system fillet fairing.

30 is a curve lying on an outboard lower wing surface propulsion system fillet fairing.

31 is the intersection or tangent point of the outboard upper wing surface fillet fairing and the outboard wing upper surface.

32 is the intersection or tangent point of the inboard upper wing surface fillet fairing and the inboard wing upper surface.

33 is the intersection or tangent point of the inboard lower wing surface fillet fairing and the inboard wing lower surface.

34 is the intersection or tangent point of the outboard lower wing surface fillet fairing and the outboard wing lower surface.

35 in a curve representing the outside surface of a nacelle at the body station of the most forward maximum-diameter rotating turbomachinery component for an alternate embodiment.

36 is the embedded area, Aemb36, that is used in the numerator of the calculation of the embedded area ratio, Aratio36.

37 is the embedded area, Aemb37, which is used to calculate Aemb36.

38 is the embedded area, Aemb38, which is used to calculate Aemb36.

39 is the dimension equal to 50% of the diameter of the fan of this previous concept.

40 is the dimension equal to 75% of the diameter of the fan of this previous concept.

41 is the dimension equal to 100% of the diameter of the fan of this previous concept.

42 is a dashed line representing the approximate location of the fan face for this previous concept.

43 is the dimension by which the lowest point of the most forward maximum-diameter rotating turbomachinery component extends below the approximate surface of the wing were the wing not displaced by the engine for the previous concept.

44 is the dimension by which the underwing propulsion system extends forward of the most forward maximum-diameter component rotating turbomachinery component for this previous concept.

45 is a curve at the spanwise location of the lowest point of the maximum diameter turbomachinery component that is on the wing upper surface 3.

46 is a curve at the spanwise location of the lowest point of the maximum diameter turbomachinery component that is on the wing lower surface 6.

47 is a curve at the spanwise location of the lowest point of the maximum diameter turbomachinery component that is on the lower propulsion nacelle surface 13.

48 is a curve at the spanwise location of the lowest point of the maximum diameter turbomachinery component that is on the upper propulsion nacelle surface 10.

49 is a line representing the aerodynamic interface plane.

Figure 2:
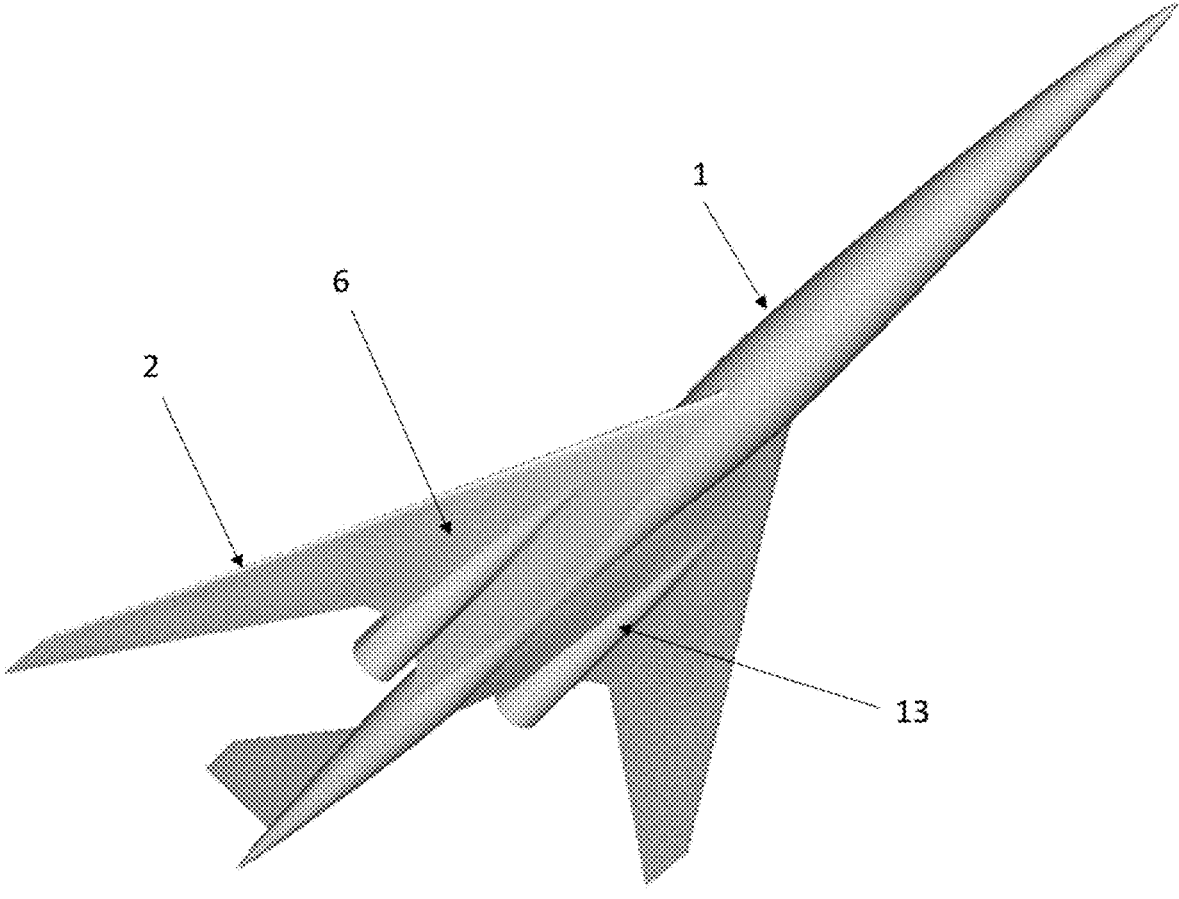
FIG. 2 shows a lower isometric view of a supersonic aircraft with one embodiment of the invention.
Figure 3:
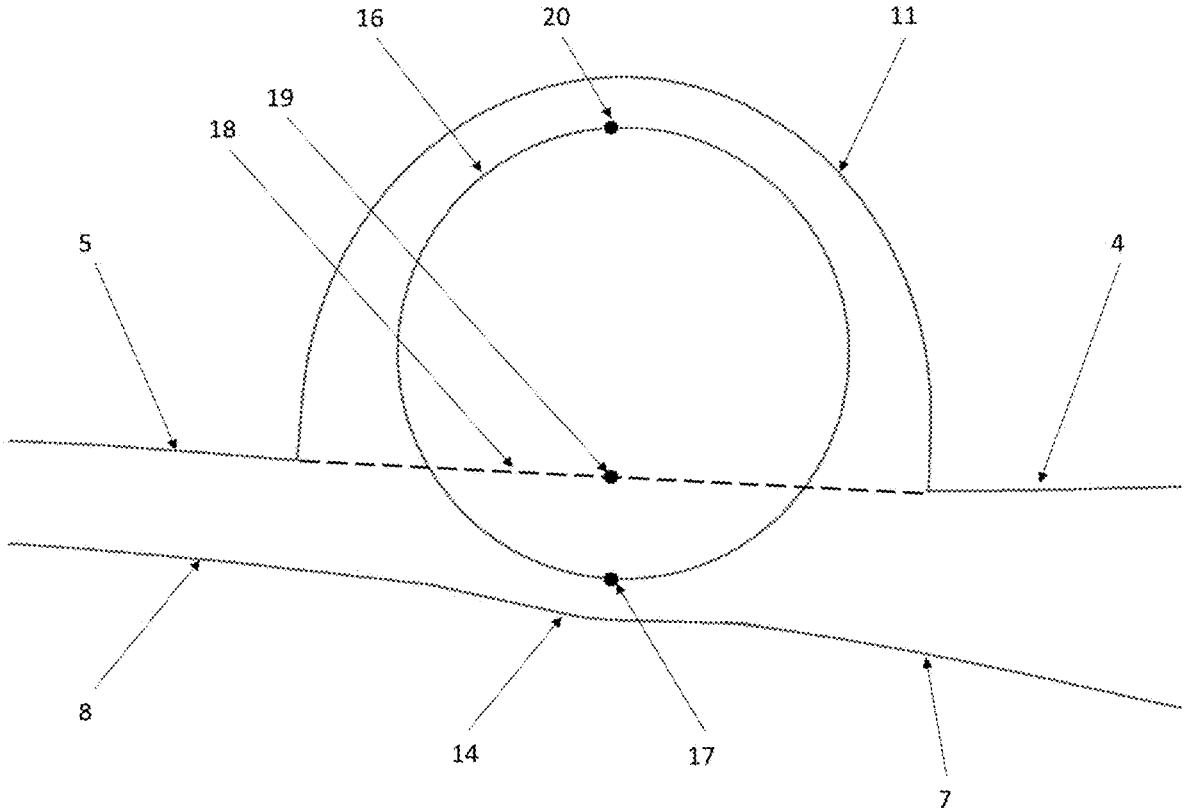
FIG. 3 shows a cut through the wing and nacelle at the mean fuselage station of the aerodynamic interface plane (AIP) of the propulsion system.
Figure 4:
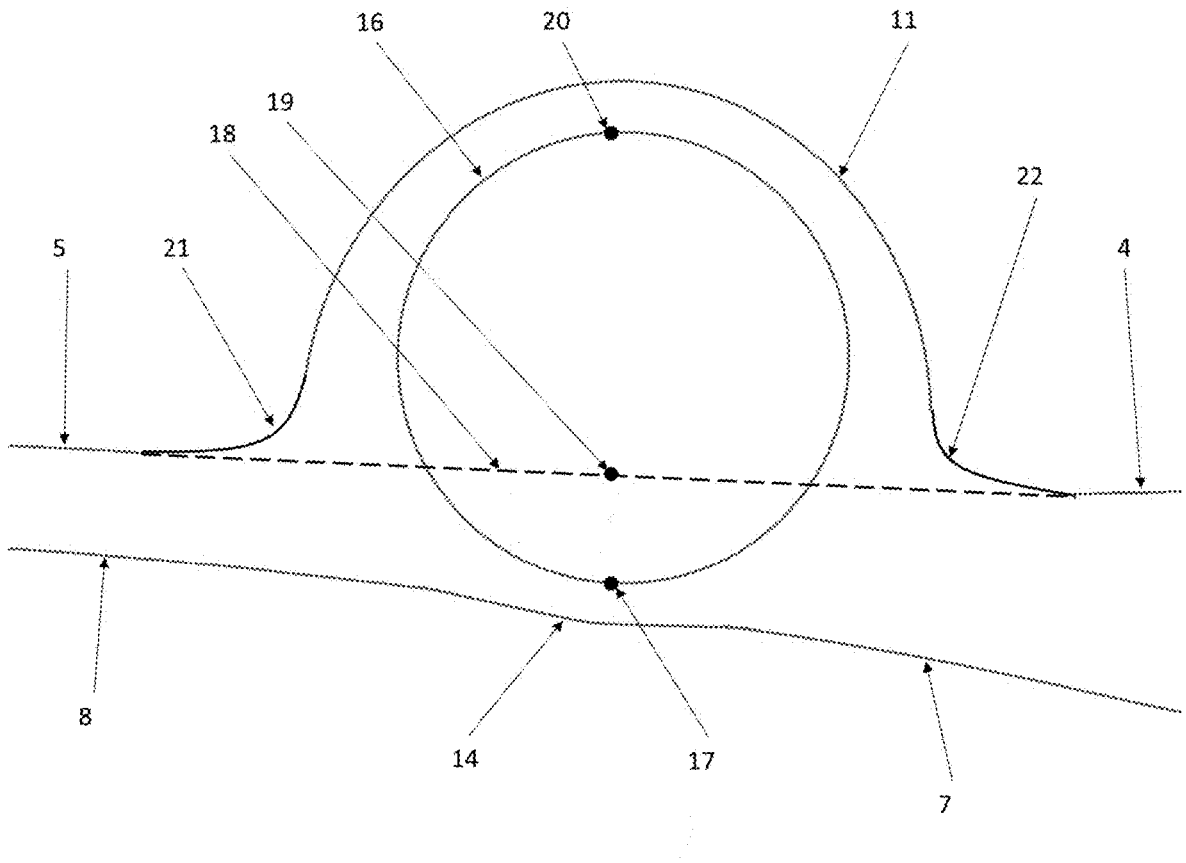
FIG. 4 shows a cut through the wing and nacelle at the mean fuselage station of the AIP of the propulsion system.
Figure 5:
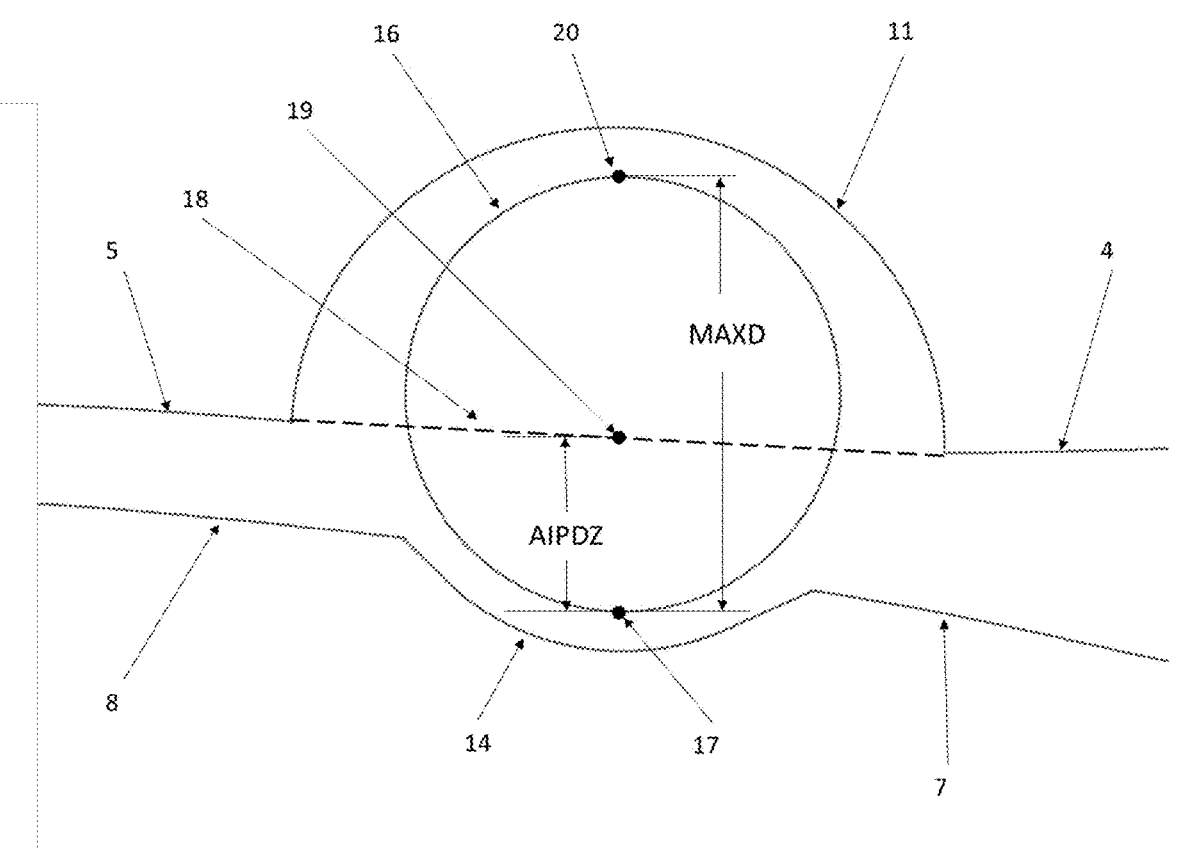
FIG. 5 shows a cut through the wing and nacelle at the mean fuselage station of the AIP of the propulsion system of another embodiment.
Figure 6:
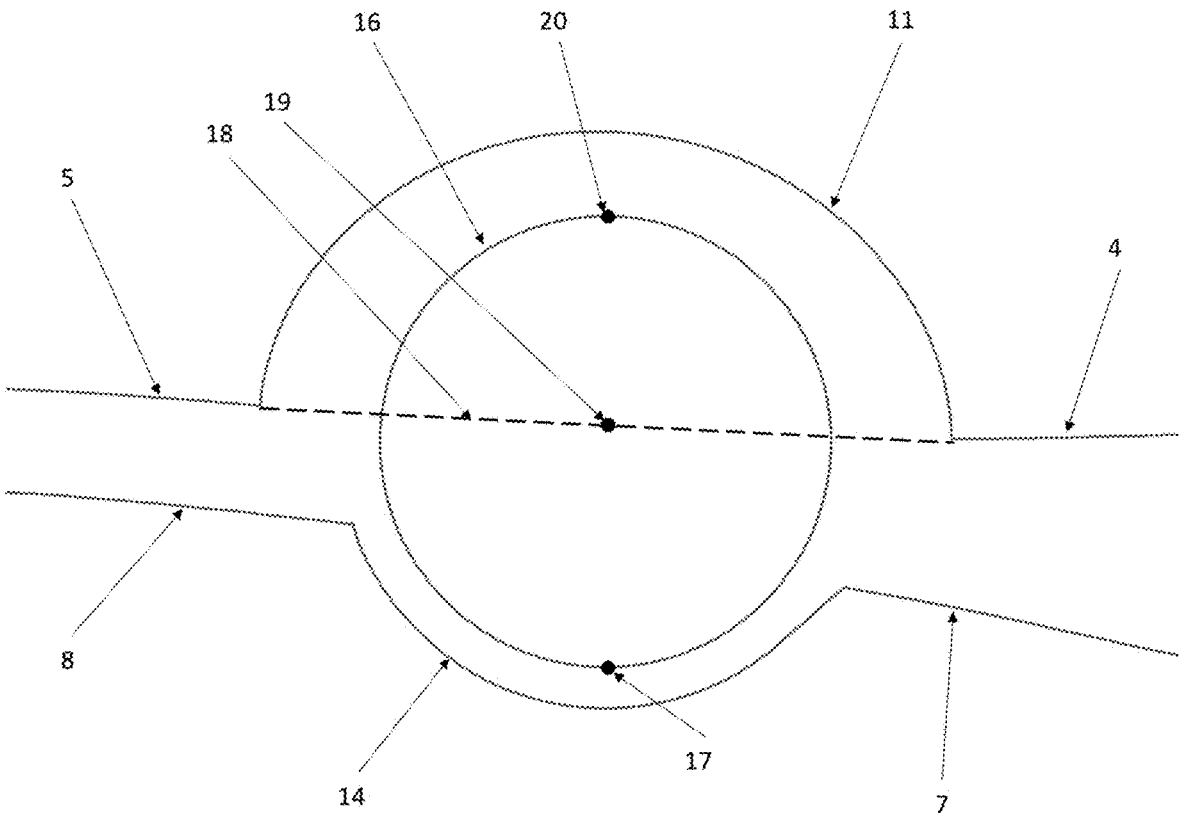
FIG. 6 shows a cut through the wing and nacelle at the mean fuselage station of the AIP of the propulsion system of another embodiment.
Figure 7:
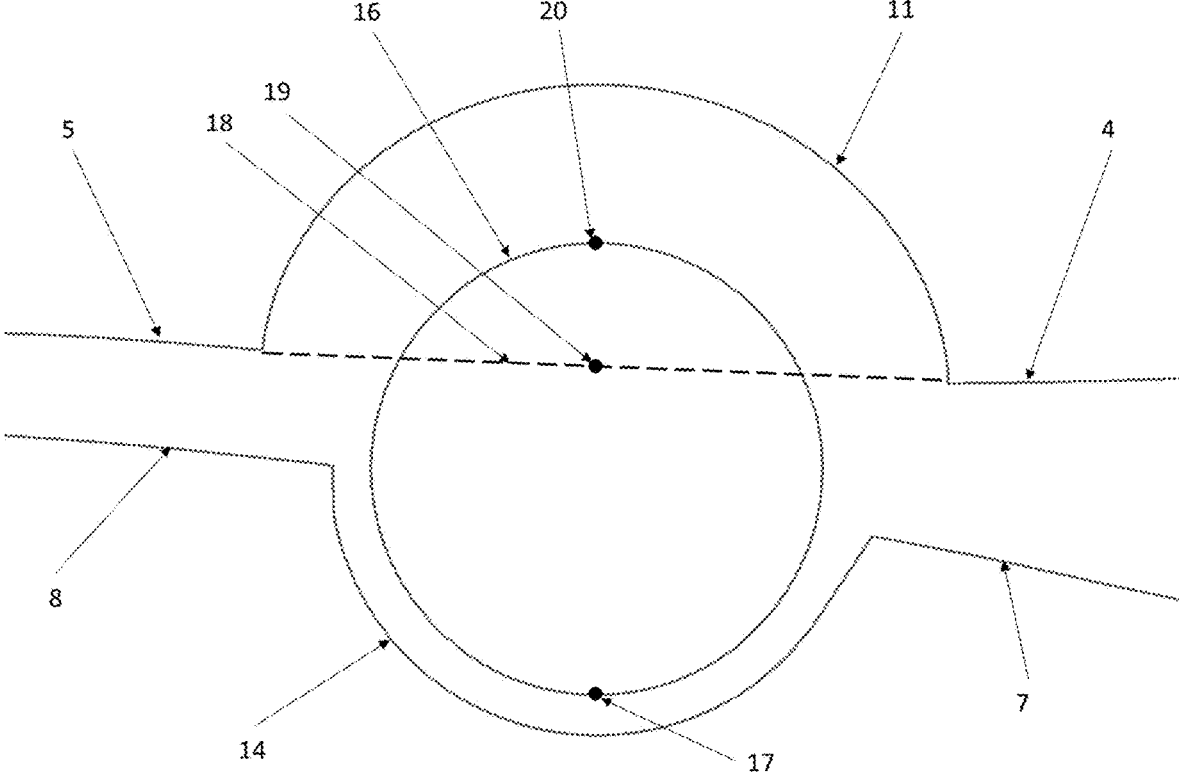
FIG. 7 shows a cut through the wing and nacelle at the mean fuselage station of the AIP of the propulsion system of another embodiment.
Figure 8:
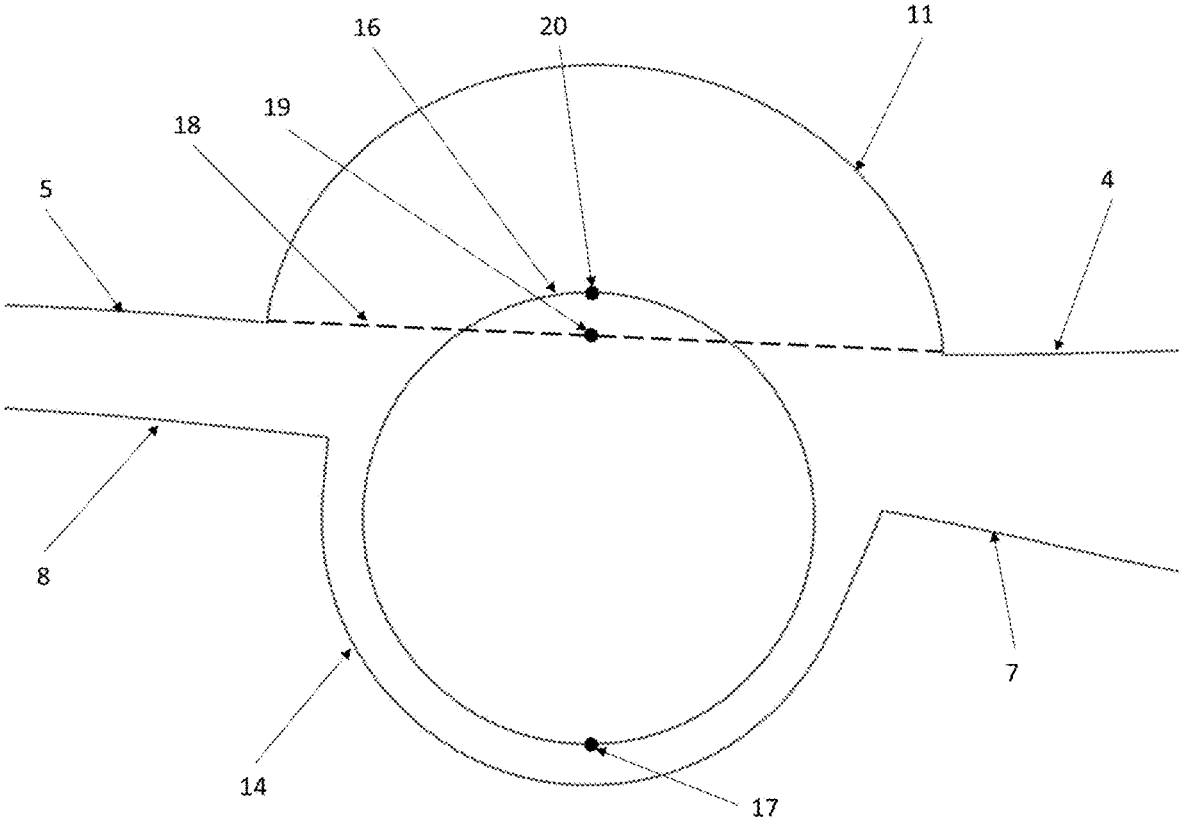
FIG. 8 shows a cut through the wing and nacelle at the mean fuselage station of the AIP of the propulsion system of another embodiment.
Figure 9:
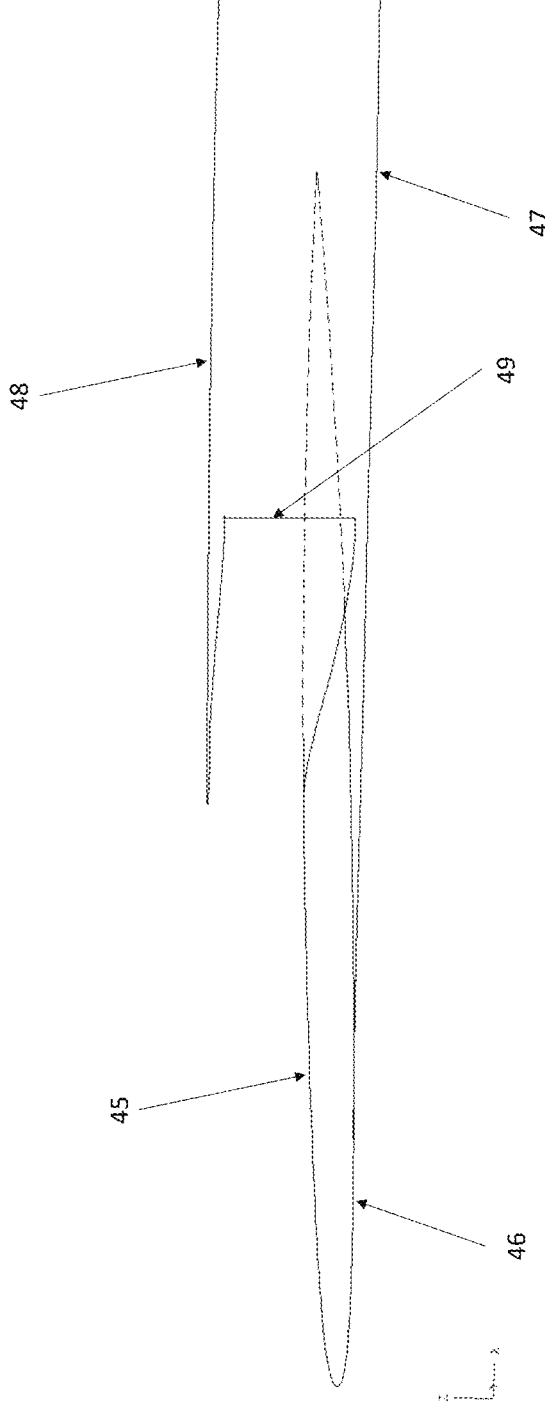
FIG. 9 shows a cut through the wing and nacelle at the mean spanwise position of the propulsion system.
Figure 10:
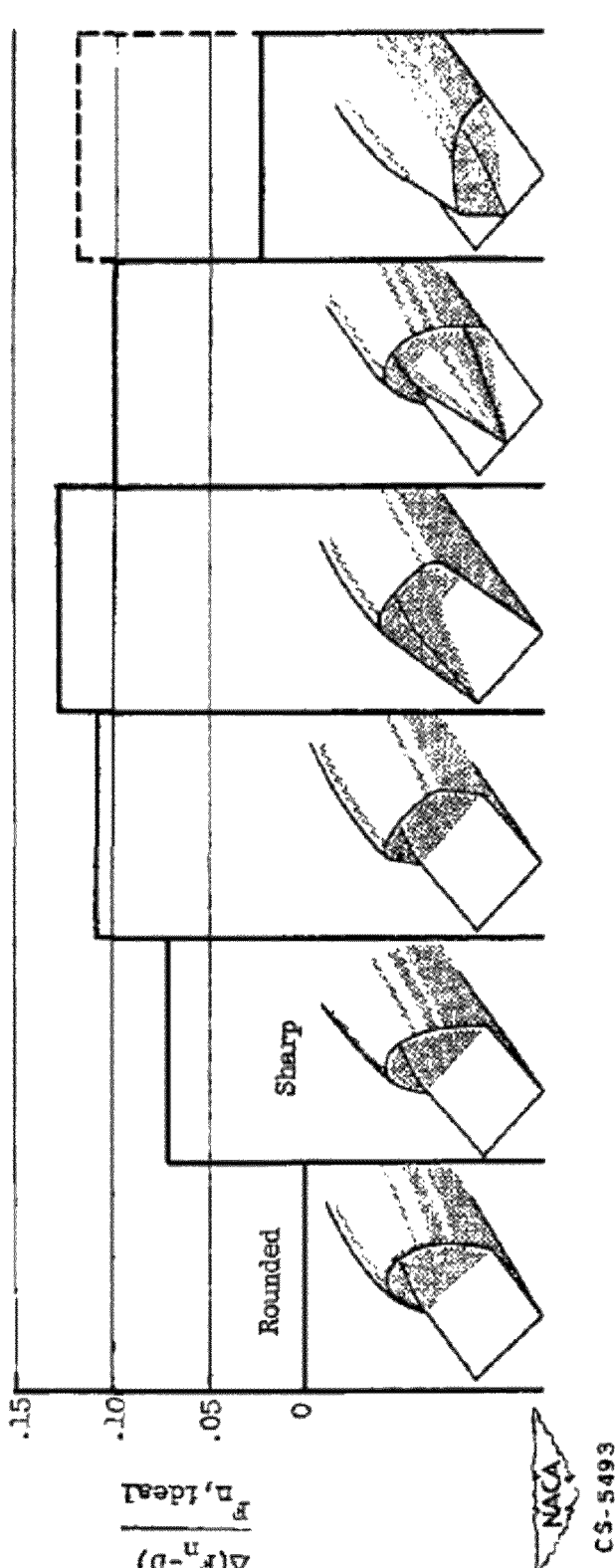
FIG. 10 shows several supersonic inlet types.
Figure 11:
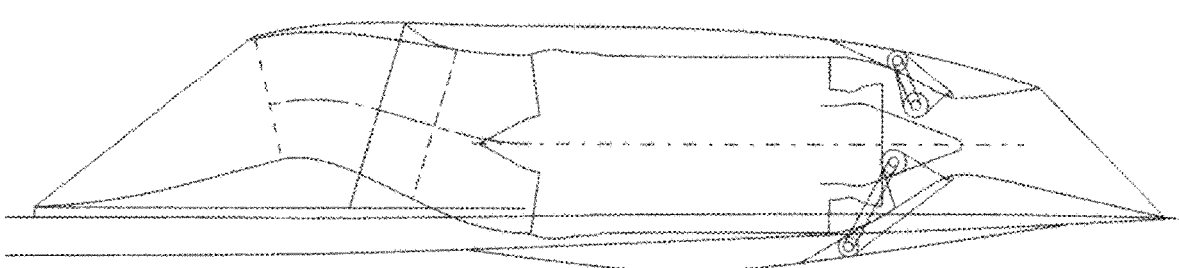
FIG. 11 shows an example of a previously existing concept.
Figure 12:
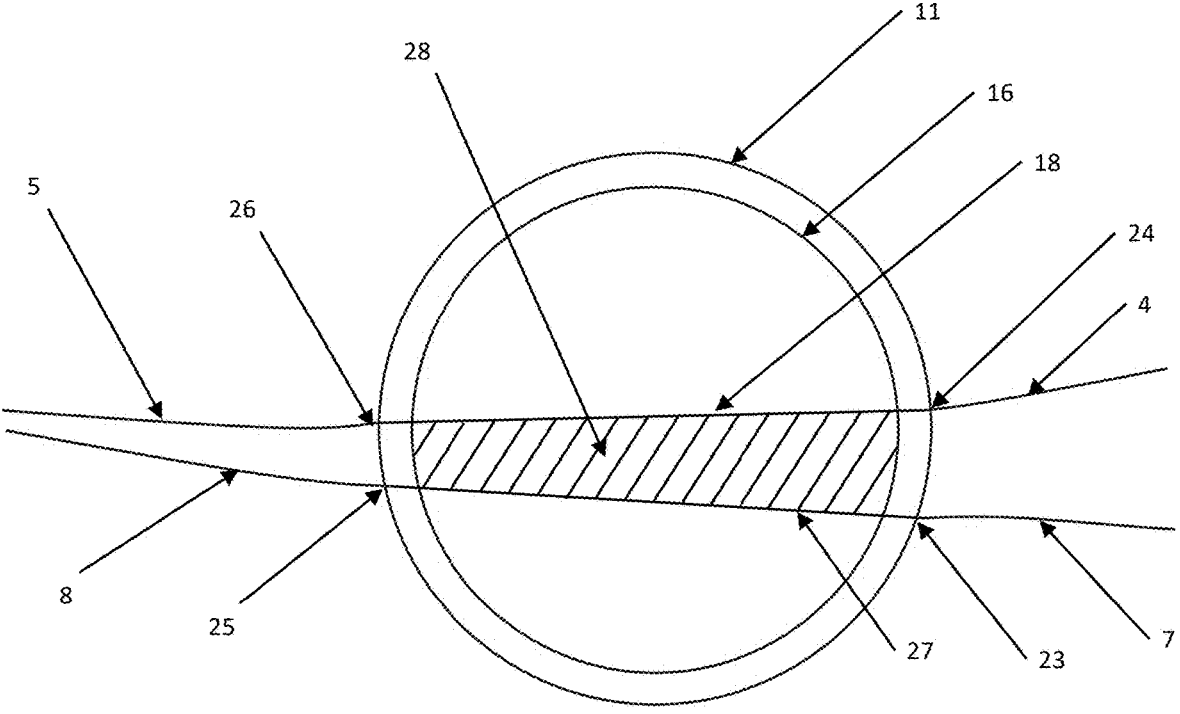
FIG. 12 shows a cross-sectional cut of one embodiment of a wing-embedded propulsion system and a portion of the inboard and outboard wing.
Figure 13:
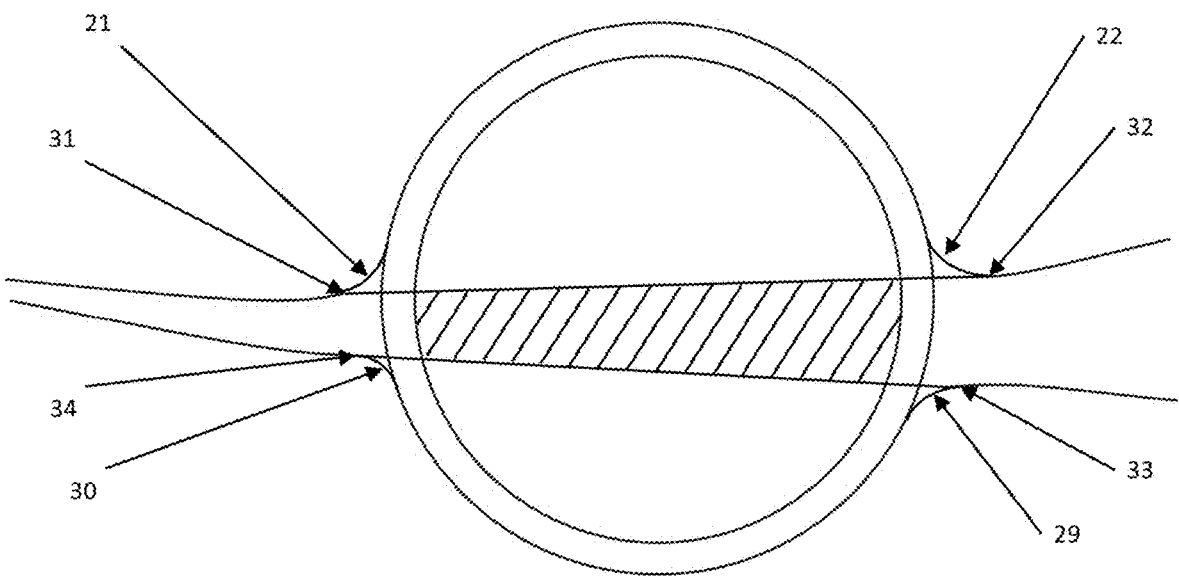
FIG. 13 shows a cross-sectional cut of one embodiment of a wing embedded propulsion system and a portion of the inboard and outboard wing along with wing-to-nacelle fillets.
Figure 14:
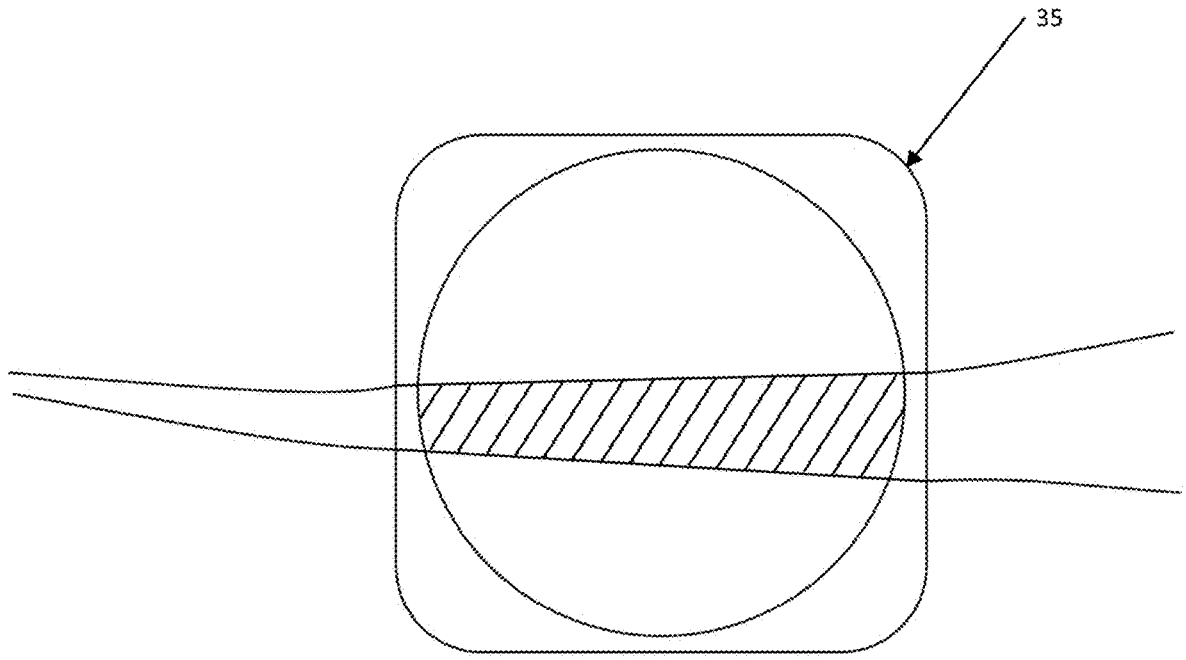
FIG. 14 shows a cross-sectional cut of another embodiment of a wing-embedded propulsion system and a portion of the inboard and outboard wing.
Figure 15:
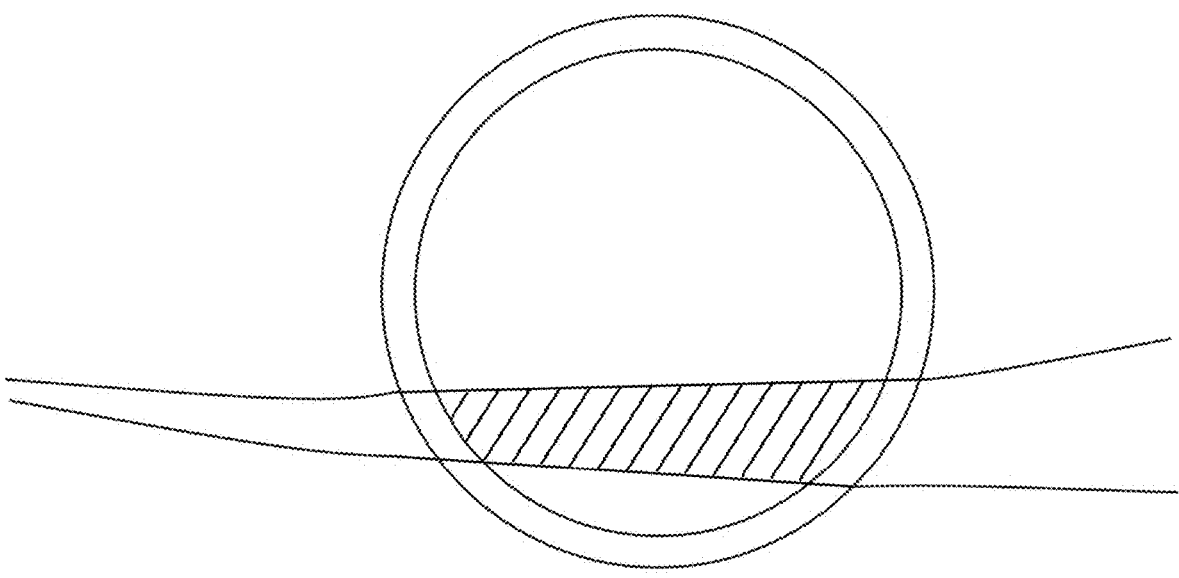
FIG. 15 shows a cross-sectional cut of another embodiment of a wing-embedded propulsion system and a portion of the inboard and outboard wing.
Figure 16:
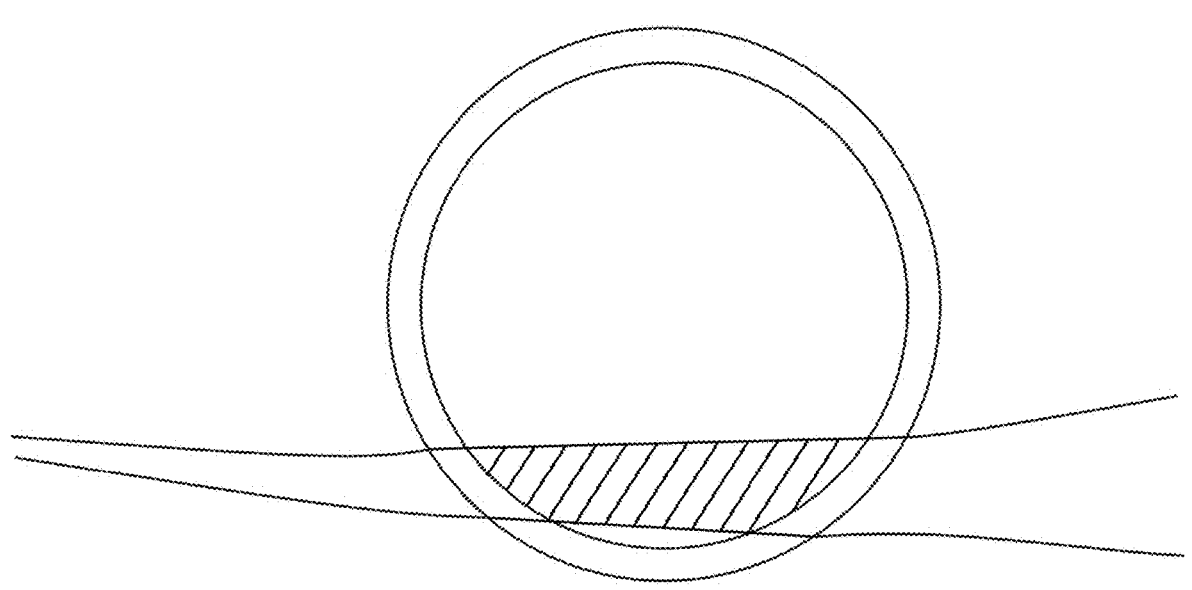
FIG. 16 shows a cross-sectional cut of another embodiment of a wing-embedded propulsion system and a portion of the inboard and outboard wing.
Figure 17:
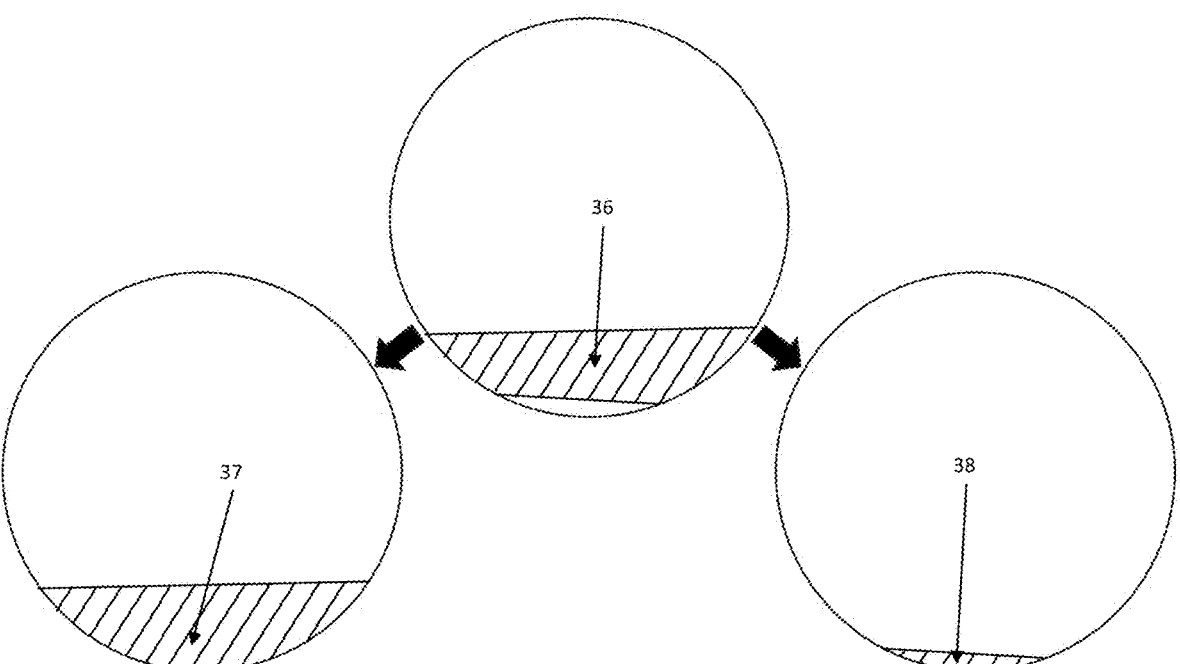
FIG. 17 shows how the fan and linear wing overlap area from FIG. 16 can be broken down into two parts for computing the ratio, Aratio, of linear wing overlap area to total fan diameter area.
Figure 18:
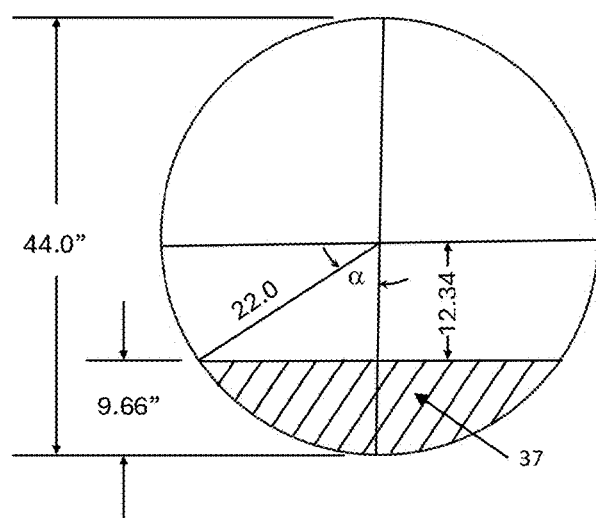
FIG. 18 shows the geometry from the bottom left of FIG. 17 rotated so that the linear interpolation of the upper wing surface is horizontal and shows an example calculation of the cross-hatched area.
Figure 20:
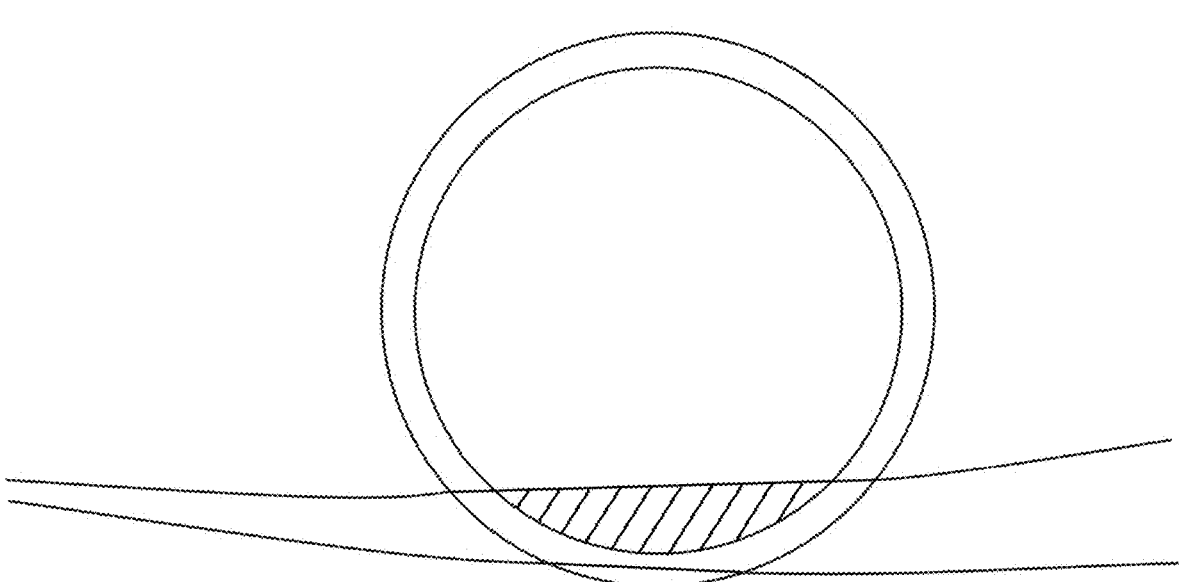
FIG. 20 shows a cross-sectional cut of another embodiment of a wing-embedded propulsion system and a portion of the inboard and outboard wing whereby the linear interpolation of the wing lower surface does not intersect the vertical position of the fan.
Figure 21:
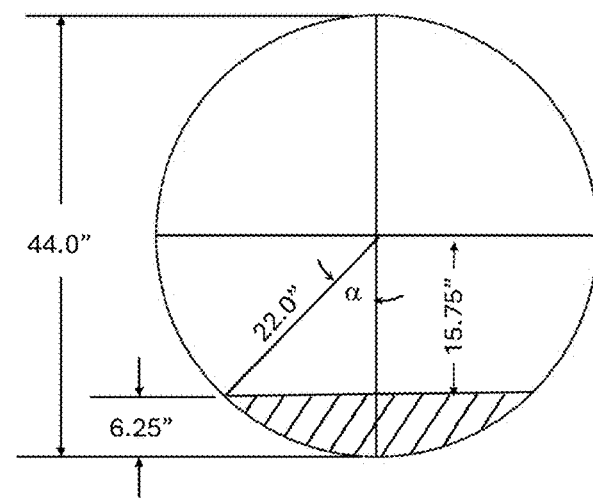
FIG. 21 shows the geometry from FIG. 20 rotated so that the linear interpolation of the upper wing surface is horizontal and includes an example calculation of cross-hatched area along with the calculation of Aratio, the linear wing overlap area to total fan diameter area.
Figure 22:
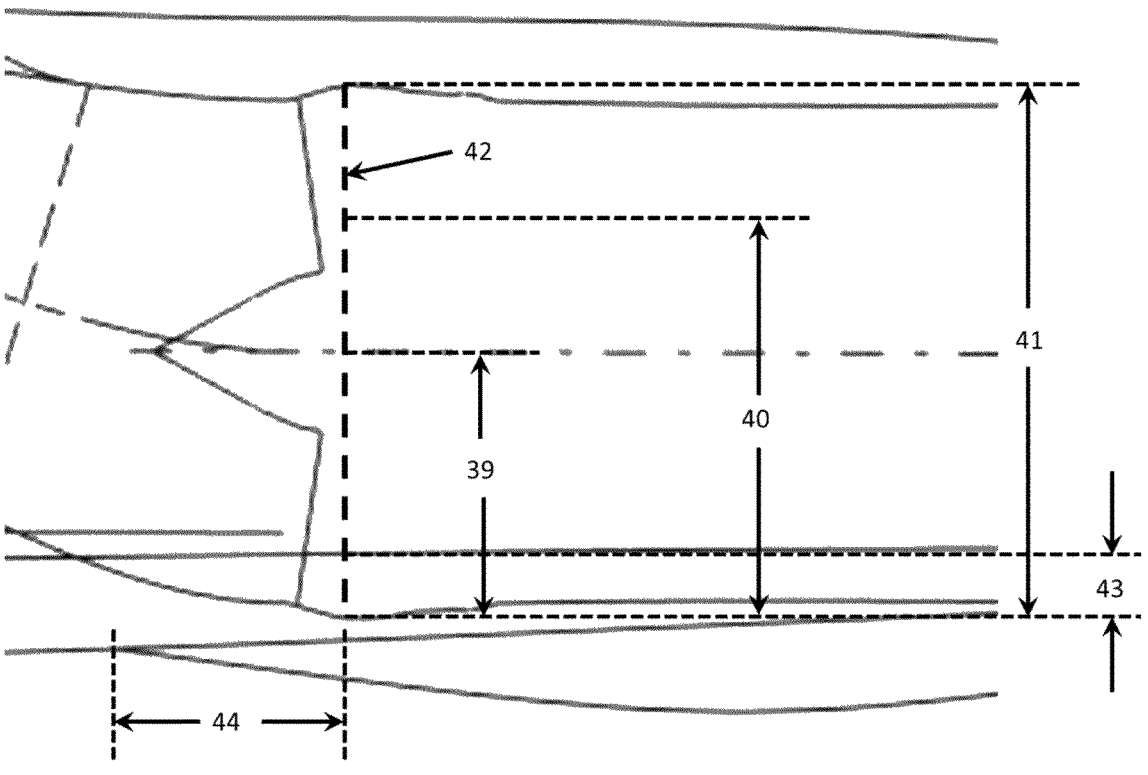
FIG. 22 shows a magnified portion of the geometry of FIG. 11 highlighting specific dimensions.
Figure 23:
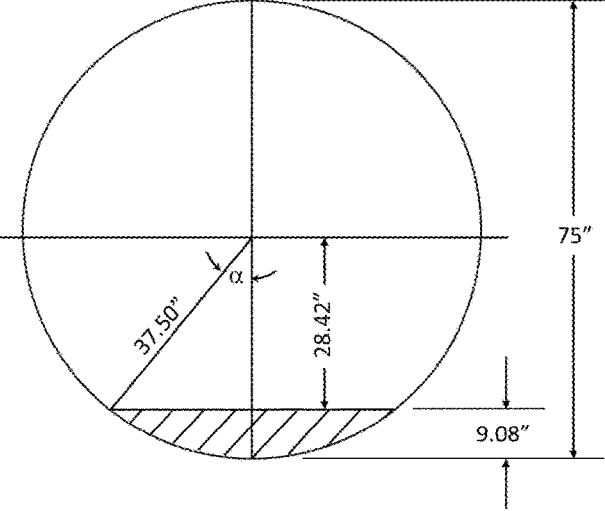
FIG. 23 shows how someone skilled in the art could take the side view geometry of FIGS. 11 and 22 and calculate the Aratio value in a manner similar to that of FIG. 21.
Figure 24:
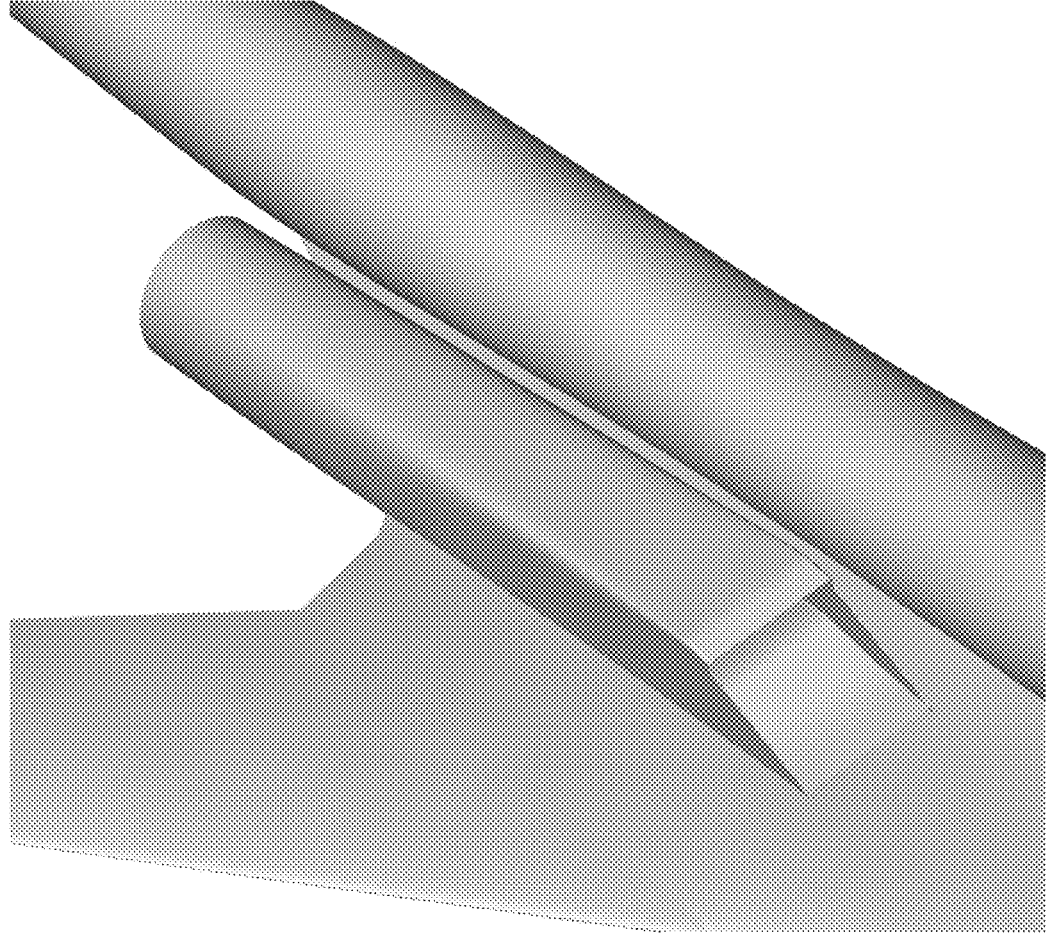
FIG. 24 shows an upper isometric view of an alternate embodiment of the invention.
Figure 25:
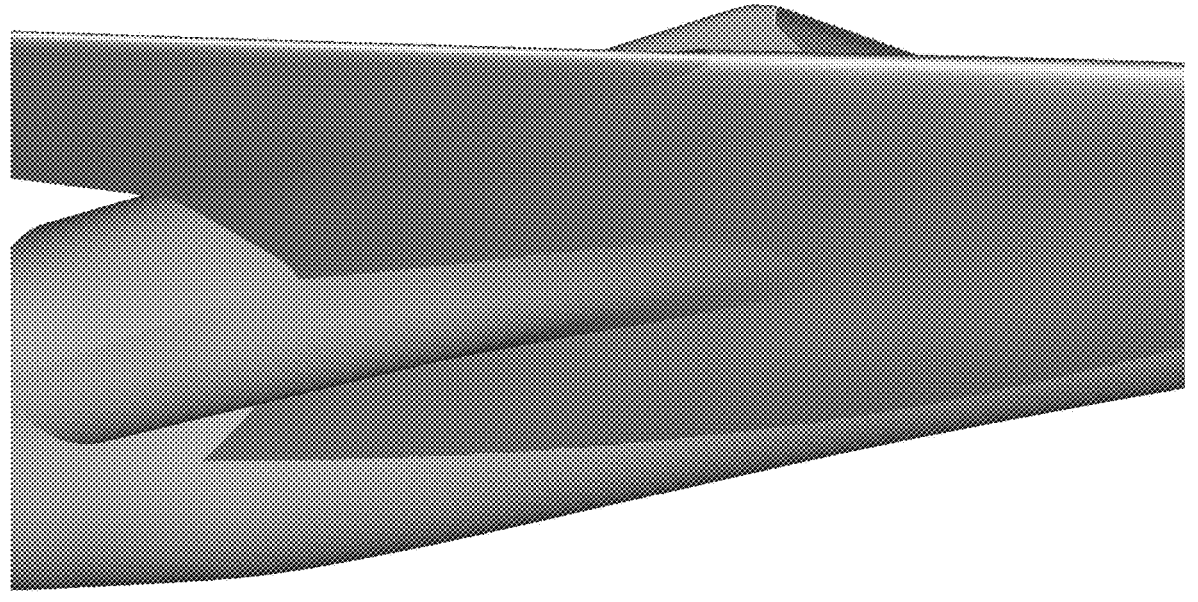
FIG. 25 shows a lower isometric view of an alternate embodiment of the invention.

FIGS. 1-2 illustrate a supersonic aircraft.

In its most complete version of one embodiment, the device is made up of the following components: (1) a fuselage, (2) a variable-sweep wing with the pivot located outboard of the engine installation, (3) two wing-mounted engines, (4) an inlet having a serpentine duct that aligns the flow perpendicular with the fan face or AIP of the engine, (5) an upper surface combined inlet and engine fairing, and (6) an engine fairing on the lower surface of the wing.

These components are related as follows:

The fuselage is a means for carrying the flight crew, payload, and fuel.

The wing is joined with the fuselage and provides lift and fuel-carrying capacity. The wing has a variable-sweep capability with the pivot located outboard of the wing-mounted engine. The supporting structure for the pivot passes beneath the forward portion of the inlet and forward of the inlet. The pivot is located at a semi-span fraction of 0.35 and a chord ratio (distance from the leading edge divided by the wing chord at the spanwise position of the pivot) of 0.375. The wing has a leading-edge radius and leading-edge camber distribution to maintain leading-edge attached flow throughout the majority of the flight regime. This prevents the creation of leading-edge vortices that would reduce lift to drag ratio and create significant distortion if ingested into the upper wing-mounted inlets.

The wing-mounted engines are installed one each on the port and starboard sides of the wing near the trailing edge and located span-wise such that the outer extent of the upper surface inlet and engine fairing is at a semi-span fraction of 0.23 and located vertically such that the centerline of the engine is located 7.3 inches above the trailing edge of the wing. The engine mounting points are located on the inboard side of the engine. The accessory gearbox is also located on the inboard side of the engine near the forward mounting point, but aft of it and embedded within the wing.

The inlet face is located far enough aft of the leading-edge of the wing to allow the wing to adequately shield forward radiated fan noise from the 'observer' or microphone located on the ground.

An upper surface combined inlet and engine fairing provides adequate volume for airflow and structure. Still, it is also designed to be aerodynamically efficient by providing low drag on the inlet fairing surface itself and positive lift interference on the surrounding surfaces. There is a reduction in cross-section area of the upper surface fairing with distance aft of the inlet face (once it is beyond the initial cowl lip region). This result in an expansion with a reduction in pressure at supersonic speeds. While there will be a drag component due to this reduced pressure acting on the aft facing component of area of the upper surface fairing, there will be a partially off-setting beneficial lift on this surface and lift interference on the surrounding wing surface. The surrounding wing surface is reflexed (trailing edge up) to optimize this lift and drag interference.

The lower surface engine fairing covers the portion of the propulsion system that protrudes below the wing, but minimizes the drag on the lower surface fairing itself while optimizing the lift and drag forces on the surrounding surfaces such as the wing. The more forward starting location and cross-sectional shape of the lower surface fairing is selected to balance the isolated friction and wave drag of the fairing with the favorable lift and drag interference with the wing and body. Low sonic boom loudness considerations may also be included in the choice of how far forward to start the lower surface engine fairing.

The variable sweep wing provides reduce cruise drag, reduce drag during climb, reduced drag during transonic acceleration, reduced drag during the flight-to-alternate portion of the reserve fuel mission, reduced drag during the hold portion of the reserve mission, and critically improved lift to drag ratio during climb-out for community noise certification and operations. An increase in lift to drag ratio during climb-out allows for a greater reduction in thrust using programmed lapse rate (PLR). PLR is a variable noise reduction system (VNRS) that is controlled by the full authority digital engine control (FADEC) system or flight management system (FMS). The ability to reduce thrust while maintaining climb gradients required for airworthiness allows for the design of higher jet velocity at maximum thrust and hence a reduced bypass ratio and hence lower fan diameter. This reduction in fan diameter reduces the weight of the propulsion system. The reduced fan diameter also reduces the installed drag of the propulsion system. Reduced fan diameter is particularly valuable when the reduction enables the use of a blisk (bladed disk) construction for the fan. This enables a reduction in hub diameter and weight.

It should be further noted that placing the inlets above the wing provides acoustical shielding of forward radiated fan noise which is often the dominant noise source on approach and can be a significant contributor to noise at the flyover noise certification location. If a commercial aircraft is to certify to ICAO Chapter 14 noise standards, it must meet FAR 36 Stage III-1 dB noise levels at each of the three measuring locations; approach, lateral, and flyover. Additionally, the cumulative noise level of all three measurement locations must be Stage III-17 dB. Since noise certification is a binary (pass/fail) test, it is common practice to design the aircraft to meet this cumulative noise level with a margin. At the conceptual design phase this margin can typically be 7 to 10 dB. The present invention is anticipated to have very low approach noise due to the combination of four features; (1) the above wing inlets that shield the forward radiated fan noise, (2) a reduced fan source noise due to the reduced thrust required as a result of the variable sweep wing, (3) a reduced landing gear length due to the high lift curve slope provided by the variable sweep wing and (4) simply hinged leading and trailing edge flaps that eliminate gaps. Each of these features has a positive (reducing) impact on approach noise: (1) At the lower speeds on approach commercial aircraft are typically at an increased attitude in order to generate sufficient lift. The wing, at angle of attack, reflects the noise emanating from the fan upward and hence reduces the noise level at the 'observer' or sensor which is located along the centerline of the runway. (2) the thrust required on approach is a function of the lift-to-drag ratio of the airplane. A variable sweep wing provides increased span relative to traditional fixed wing supersonic aircraft like Concorde. Drag due to lift is inversely proportional to the square of the span and is thus reduced by the use of a variable sweep wing. The fan noise is, in part, a function of fan speed which is a function of thrust required which is a function of the lift to drag ratio on approach. Thus, a higher approach lift-to-drag ratio reduces approach noise. (3) Airframe noise is often a significant contributor to approach noise and landing gear can be the dominant contributor to airframe noise depending upon the number of gaps and edges characterizing the high lift system. (4) The gaps found in traditional slotted slats and flaps are a significant contributor to airframe noise. By appropriate selection of wing loading and the use of a variable sweep wing, a lift coefficient that satisfies aggressive field length performance is attainable without the use of gapped high lift devices. The simply hinged leading and trailing edge flaps are lighter in weight than gapped devices and reduce airframe noise.

It should be further noted that the present invention supports the design for low sonic boom loudness. (1) The propulsion system is often a significant contributor to sonic boom loudness, by placing the inlets of the wing-mounted engines above the wing any shocks emanating from the inlet will be shielded from the ground by the wing. The ability to adjust the lower wing fairing fineness ratio also enables low sonic boom characteristics.

Measured Variables:

AIPDZ is the vertical distance between points 19 and 17.

MAXD is the maximum diameter of the largest diameter turbomachinery component.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. An aircraft capable of level supersonic flight comprising:

a wing; and a lower wing surface propulsion system fairing; and a wing-mounted propulsion system comprising an inlet, and an engine comprising a plurality of rotating turbomachinery components; and wherein the inlet is configured to obtain a majority of its air from above the wing at all flight conditions, and the inlet is located aft of a leading edge of the wing at the range of spanwise locations encompassing those of the wing-mounted propulsion system; and wherein the rotating turbomachinery comprises a component with a maximum diameter, and wherein with the aircraft configured to be self-supporting with the landing gear down on a horizontal surface, the maximum diameter component is located vertically (Z-axis) such that the lowest point of the maximum diameter component or most forward maximum diameter component if there is more than one component with the maximum diameter, is located below a line that is a linear interpolation between a plurality of points on an upper surface of the wing that are immediately inboard and immediately outboard of the wing-mounted propulsion system excluding any wing-to-nacelle fillets at the most forward body station (X-axis) of the maximum diameter turbomachinery component and at the spanwise location (Y-axis) of the lowest point on the maximum diameter turbomachinery component or most forward maximum diameter component if there is more than one component with the maximum diameter, by an amount no less than 14.0% of the diameter of the maximum diameter turbomachinery component; and wherein the underwing propulsion system fairing extends forward of the largest diameter rotating turbomachinery component or most forward maximum diameter component if there is more than one component with the maximum diameter by an amount greater than 50% of the diameter of the maximum diameter turbomachinery component.

2. The aircraft of claim 1 wherein the underwing propulsion system fairing extends forward of the largest diameter rotating turbomachinery component most forward maximum diameter component if there is more than one component with the maximum diameter by an amount greater than 75% of the diameter of the maximum diameter turbomachinery component.

3. The aircraft of claim 1 wherein the underwing propulsion system fairing extends forward of the largest diameter rotating turbomachinery component or most forward maximum diameter component if there is more than one component with the maximum diameter by an amount greater than 100% of the diameter of the maximum diameter turbomachinery component.

4. An aircraft capable of level supersonic flight comprising:

a wing capable of variable sweep; and a lower wing surface propulsion system fairing; and a wing-mounted propulsion system comprising an inlet, and an engine comprising a plurality of rotating turbomachinery components; and wherein the inlet is configured to obtain a majority of its air from above the wing at all flight conditions, and the inlet is located aft of a leading edge of the wing at the range of spanwise locations encompassing those of the wing-mounted propulsion system; and wherein the rotating turbomachinery comprises a component with a maximum diameter, and wherein with the aircraft configured to be self-supporting with the landing gear down on a horizontal surface, the maximum diameter component is located vertically (Z-axis) such that the lowest point of the maximum diameter component or most forward maximum diameter component if there is more than one component with the maximum diameter, is located below a line that is a linear interpolation between a plurality of points on an upper surface of the wing that are immediately inboard and immediately outboard of the wing-mounted propulsion system excluding any wing-to-nacelle fillets at the most forward body station (X-axis) of the maximum diameter turbomachinery component and at the spanwise location (Y-axis) of the lowest point on the maximum diameter turbomachinery component or most forward maximum diameter component if there is more than one component with the maximum diameter, by an amount no less than 14.0% of the diameter of the maximum diameter turbomachinery component; and wherein the underwing propulsion system fairing extends forward of the largest diameter rotating turbomachinery component or most forward maximum diameter component if there is more than one component with the maximum diameter by an amount greater than 50% of the diameter of the maximum diameter turbomachinery component.

5. The aircraft of claim 4 wherein the underwing propulsion system fairing extends forward of the largest diameter rotating turbomachinery component or most forward maximum diameter component if there is more than one component with the maximum diameter by an amount greater than 75% of the diameter of the maximum diameter turbomachinery component.

6. The aircraft of claim 4 wherein the underwing propulsion system fairing extends forward of the largest diameter rotating turbomachinery component or most forward maximum diameter component if there is more than one component with the maximum diameter by an amount greater than 100% of the diameter of the maximum diameter turbomachinery component.

7. An aircraft capable of level supersonic flight comprising:

a wing; and a lower wing surface propulsion system fairing; and a wing-mounted propulsion system comprising an inlet, and an engine comprising a plurality of rotating turbomachinery components; and wherein the inlet is configured to obtain a majority of its air from above the wing at all flight conditions, and the inlet is located aft of a leading edge of the wing at the range of spanwise locations encompassing those of the wing-mounted propulsion system; and wherein the rotating turbomachinery comprises a component with a maximum diameter, and wherein with the aircraft configured to be self-supporting with the landing gear down on a horizontal surface, the maximum diameter component is located vertically (Z-axis) such that the lowest point of the maximum diameter component or most forward maximum diameter component if there is more than one component with the maximum diameter, is located below a line that is a linear interpolation between a plurality of points on an upper surface of the wing that are immediately inboard and immediately outboard of the wing-mounted propulsion system excluding any wing-to-nacelle fillets at the most forward body station (X-axis) of the maximum diameter turbomachinery component and at the spanwise location (Y-axis) of the lowest point on the maximum diameter turbomachinery component or most forward maximum diameter component if there is more than one component with the maximum diameter, by an amount no less than 14.0% of the diameter of the maximum diameter turbomachinery component; and wherein the underwing propulsion system fairing extends forward of the most forward rotating turbomachinery component or most forward maximum diameter component if there is more than one component with the maximum diameter by an amount greater than 50% of the diameter of the maximum diameter turbomachinery component; and wherein the ratio of the cross-sectional area of the wing covered by the fan to the fan total frontal area at the body station of the largest diameter turbomachinery component, Aratio, is greater than 8.0%.

8. The aircraft of claim 7 wherein the underwing propulsion system fairing extends forward of the largest diameter rotating turbomachinery component or most forward maximum diameter component if there is more than one component with the maximum diameter by an amount greater than 75% of the diameter of the maximum diameter turbomachinery component; and wherein the ratio of the cross-sectional area of the wing covered by the fan to the fan total frontal area at the body station of the largest diameter turbomachinery component, Aratio, is greater than 12.0%.

9. The aircraft of claim 7 wherein the underwing propulsion system fairing extends forward of the largest diameter rotating turbomachinery component by an amount greater than 100% of the diameter of the maximum diameter turbomachinery component; and wherein the ratio of the cross-sectional area of the wing covered by the fan to the fan total frontal area at the body station of the largest diameter turbomachinery component, Aratio, is greater than 16.0%.

10. An aircraft capable of level supersonic flight comprising:

a wing capable of variable sweep; and a lower wing surface propulsion system fairing; and a wing-mounted propulsion system comprising an inlet, and an engine comprising a plurality of rotating turbomachinery components; and wherein the inlet is configured to obtain a majority of its air from above the wing at all flight conditions, and the inlet is located aft of a leading edge of the wing at the range of spanwise locations encompassing those of the wing-mounted propulsion system; and wherein the rotating turbomachinery comprises a component with a maximum diameter, and wherein with the aircraft configured to be self-supporting with the landing gear down on a horizontal surface, the maximum diameter component is located vertically (Z-axis) such that the lowest point of the maximum diameter turbomachinery component or most forward maximum diameter component if there is more than one component with the maximum diameter, is located below a line that is a linear interpolation between a plurality of points on an upper surface of the wing that are immediately inboard and immediately outboard of the wing-mounted propulsion system excluding any wing-to-nacelle fillets at the most forward body station (X-axis) of the maximum diameter turbomachinery component and at the spanwise location (Y-axis) of the lowest point on the maximum diameter turbomachinery component or most forward maximum diameter component if there is more than one component with the maximum diameter, by an amount no less than 14.0% of the diameter of the maximum diameter turbomachinery component; and wherein the underwing propulsion system fairing extends forward of the largest diameter rotating turbomachinery component or most forward maximum diameter component if there is more than one component with the maximum diameter by an amount greater than 50% of the diameter of the maximum diameter turbomachinery component; and wherein the ratio of the cross-sectional area of the wing covered by the fan to the fan total frontal area at the body station of the largest diameter turbomachinery component, Aratio, is greater than 8.0%.

11. The aircraft of claim 10 wherein the underwing propulsion system fairing extends forward of the largest diameter rotating turbomachinery component or most forward maximum diameter component if there is more than one component with the maximum diameter by an amount greater than 75% of the diameter of the maximum diameter turbomachinery component; and wherein the ratio of the cross-sectional area of the wing covered by the fan to the fan total frontal area at the body station of the largest diameter turbomachinery component, Aratio, is greater than 12.0%.

12. The aircraft of claim 10 wherein the underwing propulsion system fairing extends forward of the largest diameter rotating turbomachinery component or most forward maximum diameter component if there is more than one component with the maximum diameter by an amount greater than 100% of the diameter of the maximum diameter turbomachinery component; and wherein the ratio of the cross-sectional area of the wing covered by the fan to the fan total frontal area at the body station of the largest diameter turbomachinery component, Aratio, is greater than 16.0%.

13. The aircraft of claim 10 wherein the maximum operating Mach number, Mmo, is less than or equal to 2.20 and greater than or equal to 1.40; and wherein the propulsion system is comprised of a turbofan engine having a bypass ratio at any flight condition of less than or equal to 2.40 and greater than or equal to 0.90; and wherein the wing in the supersonic cruise condition has an aspect ratio of less than or equal to 4.00 and greater than or equal to 2.00.

14. The aircraft of claim 10 wherein the maximum operating Mach number, Mmo, is less than or equal to 2.10 and greater than or equal to 1.50; and wherein the propulsion system is comprised of a turbofan engine having a bypass ratio at any flight condition of less than or equal to 2.20 and greater than or equal to 1.10; and wherein the wing in the supersonic cruise condition has an aspect ratio of less than or equal to 3.70 and greater than or equal to 2.30.

15. The aircraft of claim 10 wherein the maximum operating Mach number, Mmo, is less than or equal to 2.00 and greater than or equal to 1.60; and wherein the propulsion system is comprised of a turbofan engine having a bypass ratio at any flight condition of less than or equal to 2.00 and greater than or equal to 1.30; and wherein the wing in the supersonic cruise condition has an aspect ratio of less than or equal to 3.40 and greater than or equal to 2.60.

* * * * *